United States Patent
Yanagihara

[19]

[11] Patent Number: 5,946,446
[45] Date of Patent: Aug. 31, 1999

[54] RECORDING AND REPRODUCTION OF VARIABLE-SPEED PLAYBACK DATA USING A SPECIFIC AREA ON EACH TRACK OF A RECORDING MEDIUM

[75] Inventor: Naofumi Yanagihara, Tokyo, Japan

[73] Assignee: Sony Corporation, Tokyo, Japan

[21] Appl. No.: 08/934,438

[22] Filed: Sep. 19, 1997

Related U.S. Application Data

[63] Continuation of application No. 08/492,856, Jun. 20, 1995, abandoned.

[30]    Foreign Application Priority Data

Jun. 23, 1994    [JP]    Japan ................................ 6-142042

[51] Int. Cl.⁶ .................................................. H04N 5/783
[52] U.S. Cl. ............................................. 386/68; 386/111
[58] Field of Search ................................ 386/68, 81, 80, 386/111, 112, 109, 46, 96, 95, 124; H04N 5/783

[56]    References Cited

U.S. PATENT DOCUMENTS

| | | |
|---|---|---|
| 5,282,049 | 1/1994 | Hatakenaka et al. . |
| 5,351,131 | 9/1994 | Nishino et al. ............................ 386/46 |
| 5,377,051 | 12/1994 | Lane et al. ................................ 386/67 |
| 5,450,209 | 9/1995 | Niimura et al. .......................... 386/67 |
| 5,543,932 | 8/1996 | Chang et al. ............................ 386/111 |
| 5,583,650 | 12/1996 | Lane et al. ................................ 386/81 |
| 5,583,654 | 12/1996 | Oguro ........................................ 386/96 |
| 5,587,805 | 12/1996 | Park ........................................ 386/112 |
| 5,589,993 | 12/1996 | Naimpally ................................ 386/81 |

FOREIGN PATENT DOCUMENTS

| | | |
|---|---|---|
| A-0 353 758 | 2/1990 | European Pat. Off. . |
| A-0 551 694 | 7/1993 | European Pat. Off. . |
| A-0 562 845 | 9/1993 | European Pat. Off. . |
| A-0 596 527 | 5/1994 | European Pat. Off. . |

*Primary Examiner*—Huy Nguyen
*Attorney, Agent, or Firm*—Frommer Lawrence & Haug, LLP.; William S. Frommer

[57]    ABSTRACT

A recording method and apparatus and a reproducing apparatus for digital signals in which data produced by encoding video signals by MPEG system, can be directly recorded and reproduced pictures having a superior picture quality may be obtained on variable-speed reproduction. According to the recording method and apparatus, each track is divided into a first area and a second area. The input data is directly recorded in the first area, and sequentially variable-speed playback data is recorded in the second area of each track. These variable-speed playback data are data among the input data which is obtained on intra-picture recording and which is collected from plural regions divided from a full frame.

10 Claims, 12 Drawing Sheets

# RECORDING AND REPRODUCTION OF VARIABLE-SPEED PLAYBACK DATA USING A SPECIFIC AREA ON EACH TRACK OF A RECORDING MEDIUM

This application is a continuation of application Ser. No. 08/492,856, filed on Jun. 20, 1995, now abandoned.

BACKGROUND OF THE INVENTION

1. Field of the Invention

This invention relates to a method and apparatus for recording and an apparatus for reproducing digital video signals. More particularly, it relates to a method for recording digital video signals whereby data produced by encoding video signals by e.g., the so-called MPEG system can be directly recorded and reproduced pictures having a superior quality may be obtained due to variable-speed reproduction.

2. Description of the Related Art

Developments of a digital video tape recorder (digital VTR), in which video signals are converted into digital signals, discrete cosine transformed and variable length encoded by e.g., Huffman encoding by way of data compression, and in which the resulting digital video signals are recorded on a magnetic tape by a rotary head in accordance with an azimuth recording system, are currently proceeding. In such digital VTR, the mode of recording video signals of the current television system, such as the NTSC system, referred to herein as SD mode, or the mode of recording of the high-definition television signals (HDTV signals), referred to herein as the HD mode, may be set.

In the SD mode, video signals are recorded after compression to digital video signals of approximately 25 Mbps, whereas, in the HD mode, HDTV signals are recorded after compression to digital video signals of approximately 50 Mbps.

With the conventional digital VTR, it has been envisaged to record input digital video signals (input data) directly on a magnetic tape and to reproduce and directly output data recorded on the magnetic tape. This has an advantage in that, by adding the function of directly recording/reproducing digital video signals (data) to the conventional digital VTR, the necessity of temporarily decoding input digital video signals for reproducing e.g., HDTV signals and re-encoding the HDTV signals in accordance with a pre-set encoding system for recording on the magnetic tape may be eliminated, thus obviating additional hardware.

Specifically, if the digital VTR is fed with digital video signals obtained on encoding video signals in accordance with the MPEG system, that is a moving picture encoding system standardized in the Work Group (WG) 11 of the Sub-Committee of Joint Technical Committee (JTC) of the International Standardization Organization (ISO) and International Electric Committee (IEC), or with digital video signals reproduced from an optical disc, it is very convenient if the digital VTR has the function of directly recording/reproducing these digital video signals.

Figure 12:
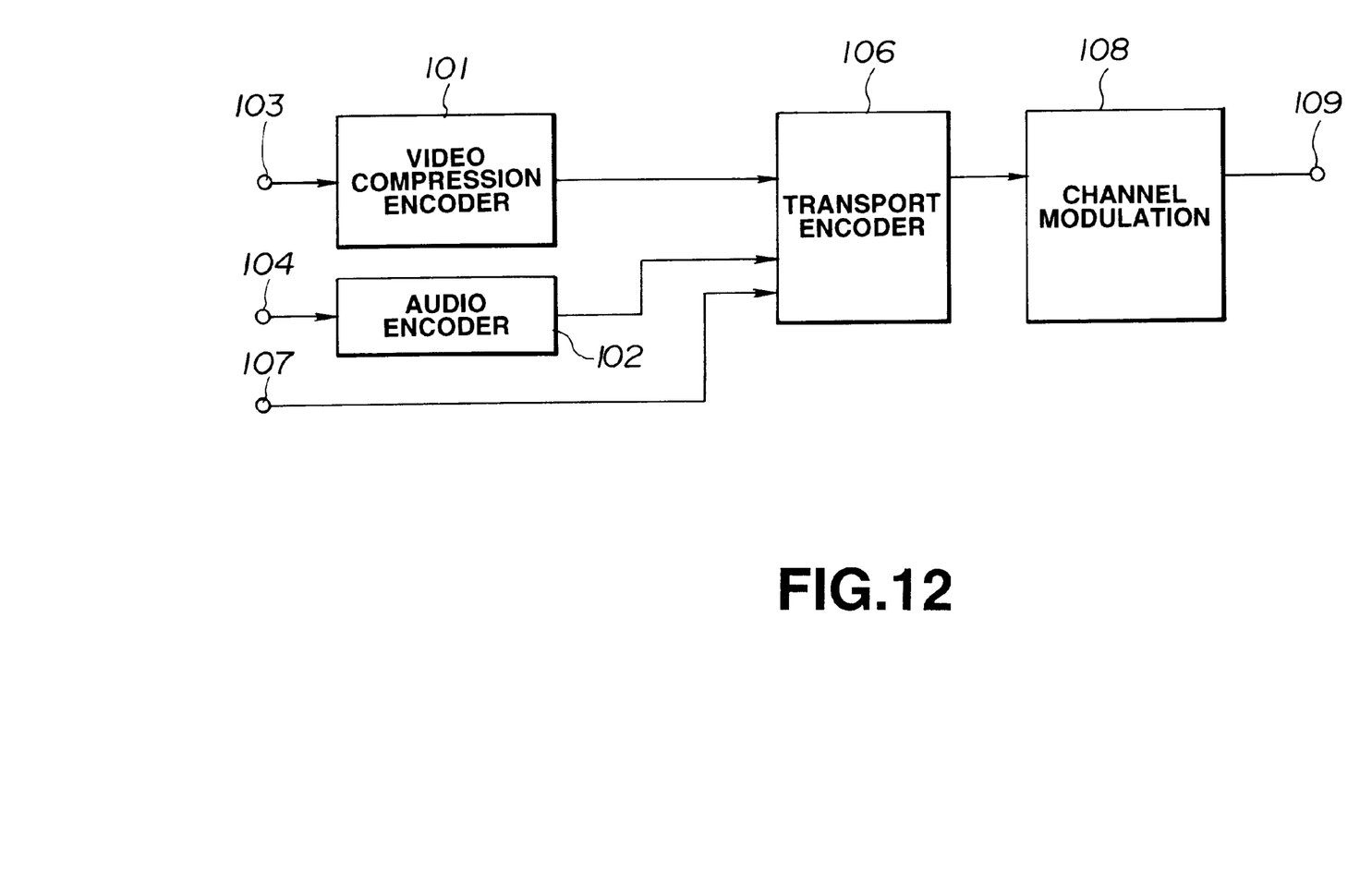
FIG. 12 is a block diagram illustrating the construction of a transmission system of the ATV system.

The Advanced Television system (ATV system), which is a digital broadcasting employing the above MPEG system as the encoding system, is now explained. FIG. 12 shows, in a block diagram, the construction of the transmission system of the ATV system. In FIG. 12, the numerals 101 and 102 denote a video compression encoder and an audio encoder, respectively. Video signals of the HDTV system are fed via an input terminal 103 to the video compression encoder 101, while audio signals are fed from an input terminal 104.

The video compression encoder 101 encodes the input HDTV signals in accordance with the MPEG system for data compression. Thus the video compression encoder 101 encodes the input HDTV signals by a high efficiency encoding system combined from DCT and motion compensation predictive coding for data compression.

Figure 13:
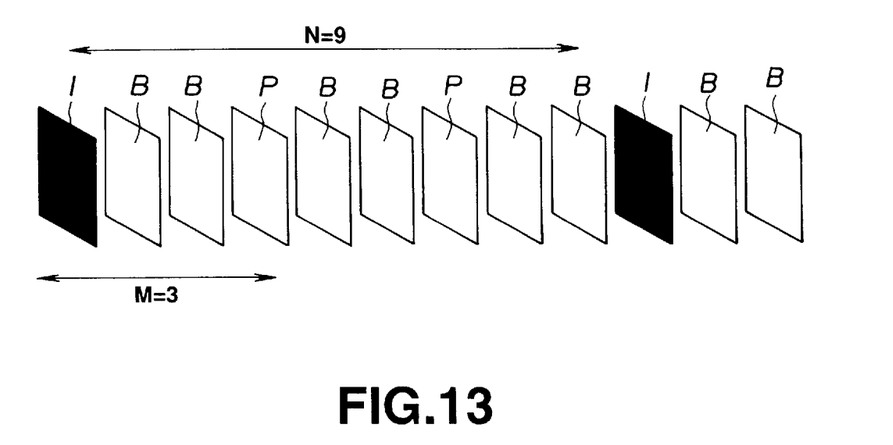
FIG. 13 illustrates the construction of a GOP of the MPEG system.

The video compression encoder 101 outputs data of an intra-field or intra-frame coded picture, that is I-picture, data of a forward prediction coded picture or P-picture and data of a bidirectionally prediction coded picture or B-picture, in a pre-set sequence, as shown in FIG. 13. In the I-picture, DCT is applied independently without employing correlation with other pictures. In the P-picture, motion compensated prediction coding is done from previous I-picture or P-picture and the difference signal, or so-called prediction error, is discrete cosine transformed. In the B-picture, motion compensated predictive coding is done from the forward and backward I-picture or P-picture and the difference signals is similarly discrete cosine transformed. The period of appearance of the I-picture is termed a group of pictures (GOP). In the present case, M and N are set so that M=3 and N=9.

A transport encoder 106 generates packets from video data encoded by the video compression encoder 101, audio data encoded by the audio encoder 104 and the ancillary information supplied to an input terminal 107.

Figure 14:
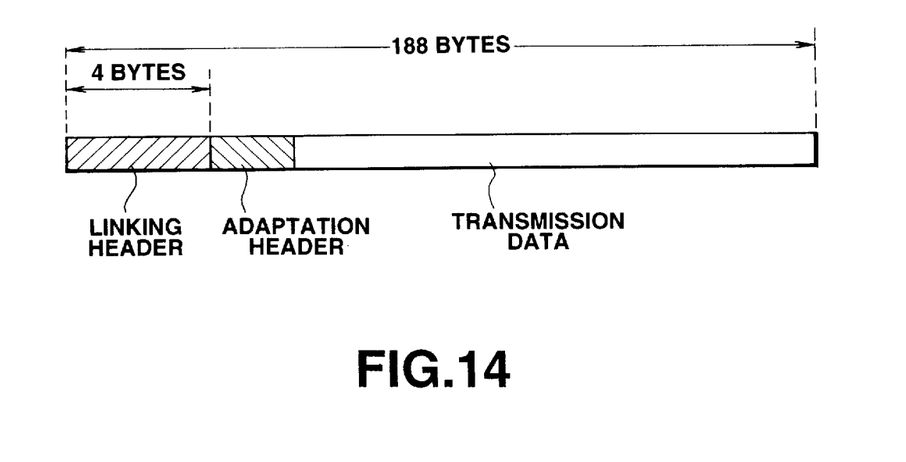
FIG. 14 illustrates the construction of a packet in the ATV system.

FIG. 14 shows packet configuration. As shown therein, a transmitted packet has a packet length of 188 bytes. At the leading end of the packet is provided a linking header having a fixed 4-byte length and an adaptation header of a variable length, followed by transmission data consisting of video or audio data.

In FIG. 12, the packet generated by the transport encoder 106 is supplied to a channel modulator 108 which modulates the packet using a carrier of a pre-set frequency. An output of the channel modulator 108 is issued at an output terminal 109.

It is possible with the ATV system to transmit HDTV signals at a rate of e.g., 19 Mbps by the above-described picture compression. This is lower than the recording rate in the SD mode of the digital VTR (about 25 Mbps). Thus the signals (data) transmitted by the ATV system can be directly recorded with the SD mode of the digital VTR. If the transmitted signals are directly recorded by the digital VTR, there is no necessity of decoding HDTV signals from the transmitted signals and entering the decoded signals into the digital VTR thus obviating additional hardware. In addition, since recording may be done with the SD mode, the recording time may be prolonged.

However, if the ATV signals are directly recorded with the SD mode on the digital VTR, variable-length reproduction cannot be achieved for the following reason.

That is, compression (encoding) pursuant to the MPEG system is done with the ATV system, as explained above. With this system, data of an intra-field or intra-frame coded picture, that is I-picture, data of a forward prediction coded picture or P-picture and data of a bidirectionally prediction coded picture or B-picture are transmitted, as also explained above. During variable-speed reproduction, data of continuous pictures cannot be produced, because the head traverses the track on the magnetic tape. If the data of the continuous pictures is not produced, data of the P-picture and the B-picture cannot be decoded. It is only the intra-picture encoded data, that is I-picture data, that can be decoded. Thus, during variable-speed reproduction, the variable-speed reproduction is enabled by employing solely the data of the I-picture among the reproduced data.

However, if the signals transmitted in accordance with the ATV system is directly recorded on the digital VTR, the packet carrying the I-picture cannot be sufficiently picked up during the variable-length reproduction. On the other hand, it is indefinite in which position the I-picture data is recorded. Thus it occurs frequently that data of the I-picture corresponding to a pre-set portion of the frame during variable-length reproduction is missing and the frame of such portion cannot be updated for a certain time thus deteriorating the picture quality.

The present Assignee previously proposed an arrangement in which data of an I-picture is extracted from an input signal bitstream of the ATV system and recorded in an area for variable speed reproduction, while the signals of the ATV system are directly recorded in other areas, such as a video sector. The area for variable speed reproduction is an area from which reproduction may be done during variable speed reproduction. In this case, data from the area for variable speed reproduction is reproduced during variable speed reproduction and a frame is formed from the data of the I-picture reproduced from this area.

The present Assignee also proposed the relevant technology in the following two Applications:

i) European Patent Publication No. 0627855 (published data, 1994.12.07)

ii) European Patent Publication No. 0650296 (published data, 1995.04.26.

The U.S. application Ser. Nos. 08/327,370 (U.S. Pat. No. 5,684,917) and 08/868,370, respectively, corresponding to these European Patent Publications are now pending at the US Patent Office. The above-mentioned applications, owned by the present Assignee, are hereby incorporated by reference.

However, the reproducible area at the time of variable-speed reproduction is changed with the speed of the variable-speed reproduction. Thus it is difficult to set multiple variable playback speeds. For example, if data for variable-speed reproduction is recorded in a common area reproducible at 17-tuple, 9-tuple or quadruple speed, variable-speed reproduction at the quadruple speed, 9-tuple speed and 17-tuple speed becomes possible, while it is difficult to achieve variable-speed reproduction at any other speed.

SUMMARY OF THE INVENTION

It is therefore an object of the present invention to provide a recording method and apparatus and a reproducing apparatus for digital video signals capable of easily variable-length reproducing ATV signals directly recorded on a recording medium at multiple variable playback speeds.

According to the present invention, there is provided a method for recording digital video signals in which encoded digital video signals obtained on adaptively switching from intra-picture encoding to inter-picture encoding and vice versa are recorded as input data on each track of a magnetic tape by azimuth recording system. The method includes the steps of dividing each track of the magnetic tape into a first area and a second area, directly recording the input data in the first area of each track, and sequentially recording variable-speed playback data in the second area of each track. The variable-speed playback data is data among the input data which is obtained on intra-picture recording and which is collected from multiple regions divided from a full frame.

According to the present invention, there is also provided an apparatus for recording digital video signals in which encoded digital video signals obtained on adaptively switching from intra-picture encoding to inter-picture encoding and vice versa are recorded as input data on each track of a magnetic tape by azimuth recording system. The apparatus has a first area in which the input data is directly recorded, a second area provided in each track of the magnetic tape for recording variable-speed playback data therein, and a signal processing circuit for extracting, from data derived from intra-picture encoding, the variable-speed playback data, collected from respective regions divided from a full frame, by variable speed playback data extracting means, to provide variable playback data, and for time-divisional multiplexing of the variable playback data and the input data by multiplexing means for recording on the track of the magnetic tape.

According to the present invention, there is additionally provided an apparatus for reproducing digital video signals from a magnetic tape having a track having recorded thereon by an azimuth recording system encoded digital video signals obtained on adaptively switching from intra-picture encoding to inter-picture encoding and vice versa. The track has a first area in which the encoded digital video signals are directly recorded and a second area in which data among said input data which is obtained on intra-picture recording and which is collected from multiple regions divided from a full frame is sequentially recorded. The apparatus includes data separating means for separating data reproduced from the first area and data from the second area, from each other, and memory means having a storage capacity of storing one-frame data and supplied with data reproduced from the second area via the data separating means. The apparatus also has interpolating means for interpolating missing portions of data stored in the memory means during variable-speed reproduction and reproduced from the second area, and data switching means for selecting data reproduced from the first area and supplied from the data separating means during normal reproduction and selecting data interpolated by the interpolating means during variable-speed reproduction. The apparatus also includes a signal processing circuit for interpolating missing portions of data reproduced from the second area during variable-speed reproduction and for outputting the interpolated data as playback data for one frame.

With the method for recording digital video signals according to the present invention, each track of the magnetic tape has a first area and a second area, the input data is directly recorded in the first area of each track, and sub-sampled set data for variable-speed reproduction is sequentially recorded in the second area of each track, which sub-sampled data set is data among said input data which is obtained on intra-picture recording and which is collected from multiple regions divided from a full frame.

With the apparatus for recording digital video signals according to the present invention, a first area in which the input data is directly recorded and a second area provided in each track of the magnetic tape for recording variable-speed playback data are provided in each track of the magnetic tape, and the variable-speed playback data, collected from respective regions divided from a full frame, are extracted from data derived from intra-picture encoding by variable speed playback data extracting means to provide variable playback sub-sampled data set, and for time-divisional multiplexing of the variable playback sub-sampled data set and the input data by multiplexing means for recording on the track of the magnetic tape. Thus a full frame picture may be constituted on reproducing the sub-sampled set data so that variable-speed reproduction may be achieved at an optional speed.

On the other hand, with the reproducing apparatus for reproducing digital video signals according to the present invention, data for variable-speed playback reproduced from the second area may be stored in memory means and missing data portions may be interpolated by interpolating means for producing playback data of high picture quality.

Thus the present invention provides a recording method and apparatus and a reproducing apparatus for digital video signals whereby ATV signals directly recorded on a recording medium may be easily variable-speed reproduced at an optional variable reproducing speed.

DETAILED DESCRIPTION OF PREFERRED EMBODIMENTS

Referring to the drawings, preferred embodiments of the recording method and apparatus and the reproducing apparatus for digital video signals according to the present invention are disclosed.

Figure 1:
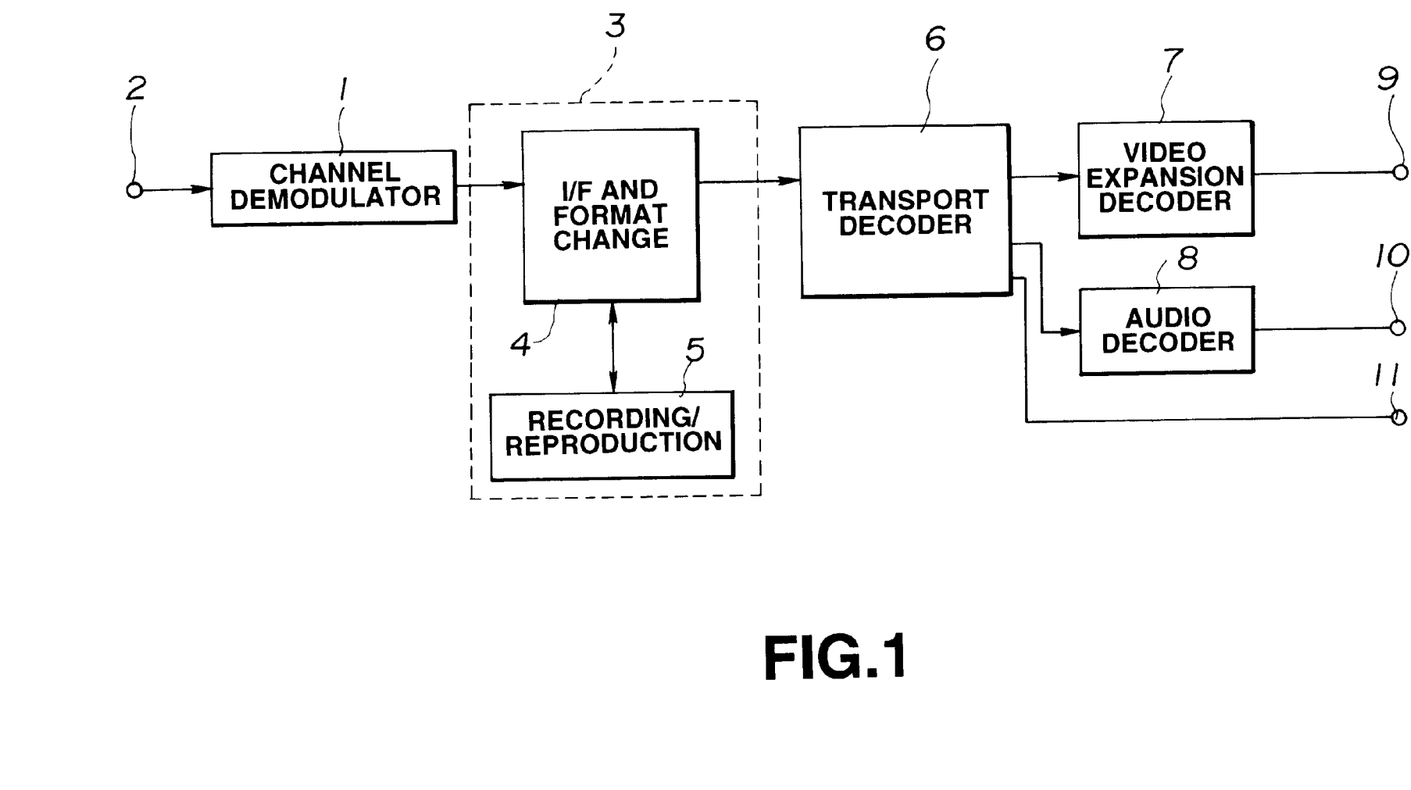
FIG. 1 is a block diagram showing the configuration of a video recording/reproducing system according to the present invention.

FIG. 1 shows, in a block diagram, a configuration of a video recording/reproducing system employing a digital VTR according to the present invention. In this figure, signals of the ATV system, that is modulated transmission data, enter a channel demodulator 1. The channel data modulator 1 demodulates modulated transmission data to reproduce packets of transmission data.

A digital VTR 3 of the azimuth recording system includes an interfacing and format converting section 4 and a recording/reproducing section 5. Data packets from the channel modulator 1 are supplied via the interfacing and format converting section 4 to a transport decoder 6, while being also supplied to the recording/reproducing section 5. The data supplied to the recording/reproducing section 5 via the interfacing and format converting section 4 is recorded in the recording/reproducing section 5 on the magnetic tape by a rotary head. The interfacing and format converting section 4 formats data sent to the recording/reproducing section 5, so that, when the data recorded by the recording/reproducing section 5 is reproduced, an optimum picture will be reproduced, in a manner to be explained subsequently.

The recording/reproducing section 5 discrete cosine transforms and variable length encodes the video signals by way of signal compression to record the resulting compressed data by the rotary head on the magnetic tape. That is, the recording/reproducing section 5 can be set to the SD mode of recording video signals of the NTSC system or the HD mode of recording HDTV signals. When directly recording the ATV system signals, supplied via the interfacing and format converting section 4, that is the transmission data, the recording/reproducing section 5 is set to the SD mode.

The transport decoder 6 corrects errors of data packets supplied thereto via the interfacing and format converting section 4, while taking out data and ancillary information from the data packets.

A video expansion decoder 7 decodes the Huffman code and effects inverse DCT for expanding the data supplied thereto in order to form baseband signals of the HDTV system. The video expansion decoder 7 and the audio decoder 8 are fed with an output of the transport decoder 6. The video expansion decoder 7 expands the transmitted data and converts them into analog signals in order to form HDTV signals.

The HDTV signals, thus formed, are outputted at an output terminal 9. The audio data is decoded by the audio decoder 8 to generate audio signals which are outputted at an output terminal 10. The output ancillary information from the transport decoder 6 is outputted at an output terminal 11.

Figure 2:
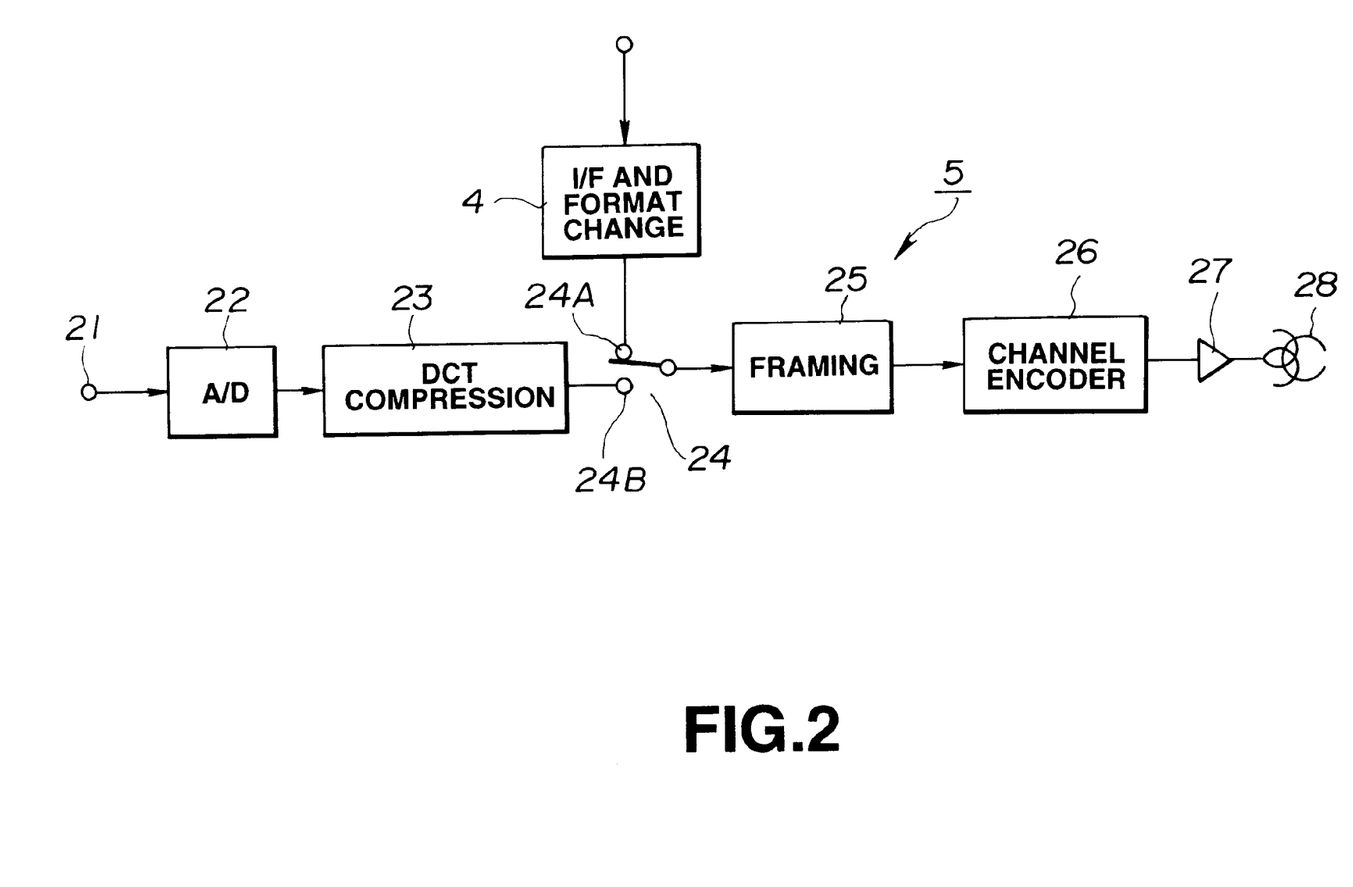
FIG. 2 is a block diagram showing the configuration of a VTR recording system according to the present invention.

FIG. 2 shows, in a block diagram, a configuration of a recording system of a digital VTR 3 according to the present invention.

In FIG. 2, the numeral 21 denotes an input terminal for video signals of the current television system, such as the NTSC system, or HDTV signals. For recording video signals from outside, component video signals of the video signals of the current television system or HDTV system are supplied to the input terminal 21. The component video signals from the input terminal 21 are supplied to an A/D converter 22 so as to be converted into digital signals.

A DCT compression processing circuit 23 encodes and compresses input video signals by DCT and VLC. That is, the component video signals, converted into digital signals from the A/D converter 22, are supplied to DCT compression processing circuit 23 so as to be blocked, shuffled and discrete cosine transformed to produce data (so-called DCT coefficients) which are buffered with a pre-set buffer unit. The total buffer-based code quantity is estimated and an optimum quantization table which will give the total code quantity less than a pre-set value is determined. Quantization is done in accordance with this optimum quantization table. The resulting quantized data is variable length encoded and subsequently framed.

A switching circuit 24 is switched between recording the transmitted ATV system signals and recording the video signals from the input terminal 21. The switching circuit 24 has its fixed input terminal 24A supplied with the ATV signals via the interfacing and format converting section 4. On the other hand, the switching circuit 24 has its fixed input terminal 24B supplied with an output of the DCT compression processing circuit 23. For recording the transmitted ATV system signals, the switching circuit 24 is set to the side of the fixed input terminal 24A. For recording the video signals from the input terminal 21, the switching circuit 24 is set to the side of the fixed input terminal 24B.

A framing section 25 frames recording data, supplied thereto via the switching circuit 24, into a pre-set sync block, while effecting error correction.

An output of the framing section 25 is fed to a channel encoder 26 and thereby modulated. An output of the channel encoder 26 is supplied via a recording amplifier 27 to a rotary head 28. The rotary head 28 records compressed video signals or HDTV signals from the input terminal 21 or the ATV signals from the input terminal 2.

That is, for recording the transmitted ATV system signals in the above-described recording system, the switching circuit 24 is set to the side of the fixed input terminal 24A. Thus the ATV system signals, supplied via the interfacing and format converting section 4, are framed by the framing section 25 and modulated by the channel encoder 26 so as to be recorded by the rotary head 28 on the magnetic tape.

On the other hand, for recording video signals from the input terminal 21, the switching circuit 24 is set to the side of the fixed input terminal 24B. Thus the video signals from the input terminal 21 are encoded and compressed by the DCT compression processing circuit 23 and framed by the framing circuit 25 so as to be then modulated by the channel encoder 26 and subsequently recorded by the rotary head 28 on the magnetic tape.

For recording the ATV system signals, the interfacing and format converting section 4 arranges data so that an area reproducible during variable-speed reproduction will be a trick play area and data of an I-picture (DCT coefficients of a fixed length) will be recorded in this trick play area, in order to improve the picture quality for variable-speed reproduction, as will be explained subsequently. During variable-speed reproduction, the I-picture data is read out from this trick play area and decoded.

Figure 3:
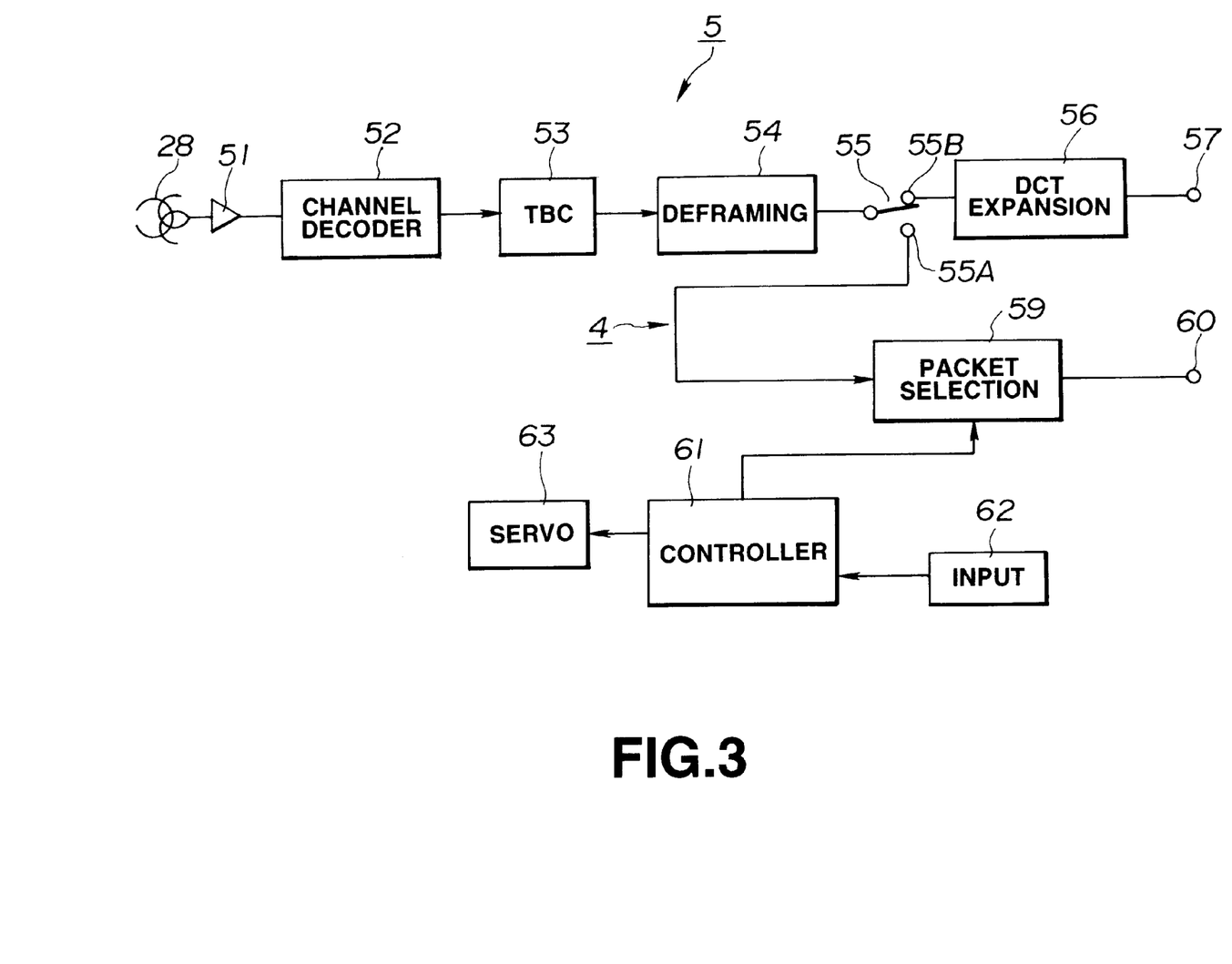
FIG. 3 is a block diagram showing the configuration of a reproducing system of the digital VTR.

FIG. 3 shows, in a block diagram, a configuration of a reproducing system of the digital VTR 3. In this figure, recorded signals of a magnetic tape are reproduced by the rotary head 28 and sent via a playback amplifier 51 to a channel decoder 52. The channel decoder demodulates the playback signals in accordance with a demodulating system which is a counterpart of the modulating system of the channel encoder 26 of the recording system described above.

A time base corrector (TBC) 53 eliminates jitter in the playback signals. That is, the TBC 53 is fed with write clocks and readout clocks, which are respectively based on the playback signals and on reference signals, while being also fed with an output of the channel decoder 52. The TBC eliminates jitter in the playback signals.

A deframing section 54 is a counterpart of the framing section 25 of the recording system, and corrects errors in the playback data from the TBC 53.

A switching circuit 55 is switched between reproducing the ATV system signals and reproducing component video signals. An output of the deframing section 54 is supplied to a switching circuit 55. If the playback signals are ATV system signals, the switching circuit 55 is switched to the side of a fixed input terminal 55A. If the playback signals are component video signal, the switching circuit 55 is switched to the side of a fixed input terminal 55B.

A DCT expansion circuit 56 is a counterpart of the DCT compression processing circuit 23. That is, the DCT expansion circuit 56 decodes variable length codes, which are playback data, and inverse discrete cosine transforms the decoded data for expanding the compression-recorded component video signals into the original baseband video signals. That is, an output of the fixed input terminal 55B of the switching circuit 55 is supplied to the DCT expansion circuit 56 whereby playback data is restored to baseband video signals which are outputted at an output terminal 57.

An output of the terminal 55A of the switching circuit 55 is supplied to a packet selection circuit 59. For usual reproduction of the ATV system signals, the packet selection circuit 59 selects all of the packets of the playback data supplied thereto via the switching circuit 55. On the other hand, for variable speed reproduction, only I-picture data are valid. Thus, for variable speed reproduction, the packet selection circuit 59 selects and outputs data packets of the I-picture data obtained on reproducing the trick play area. An output of the packet selection circuit 59 is issued at an output terminal 60.

A controller 61 performs control of switching between normal reproduction and variable speed reproduction. The controller 61 is fed with a mode setting signal from an input section 62. A servo circuit 63 and the packet selection circuit 59 are controlled responsive to this mode setting signal. During variable speed reproduction of the ATV system signals, the servo circuit 63 effects phase control and tape speed control by exploiting tracking signals, such as ATF signals, for fixing the phase so that the position traced by the head will be perpetually the same position on the track. That is, during variable speed reproduction, the trick play area is reproduced, so that the I-picture data recorded in the trick play area will be reproduced.

An output of the output terminal 60 is sent to the video expansion decoder 7 of FIG. 1 for decoding. In the present embodiment, all I-picture data for one full frame is recorded in the trick play area. Consequently, during variable-speed reproduction, the actual picture is updated with one full frame as a unit, thus giving an easy-to-see reproduced picture.

The variable speed reproduction in the digital VTR according to the present invention is explained in detail.

Figure 4:
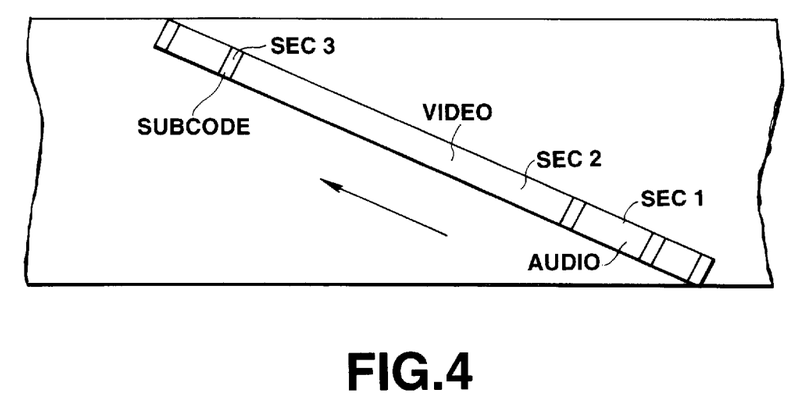
FIG. 4 illustrates the construction of a track on a magnetic tape for the digital VTR.
Figure 5:
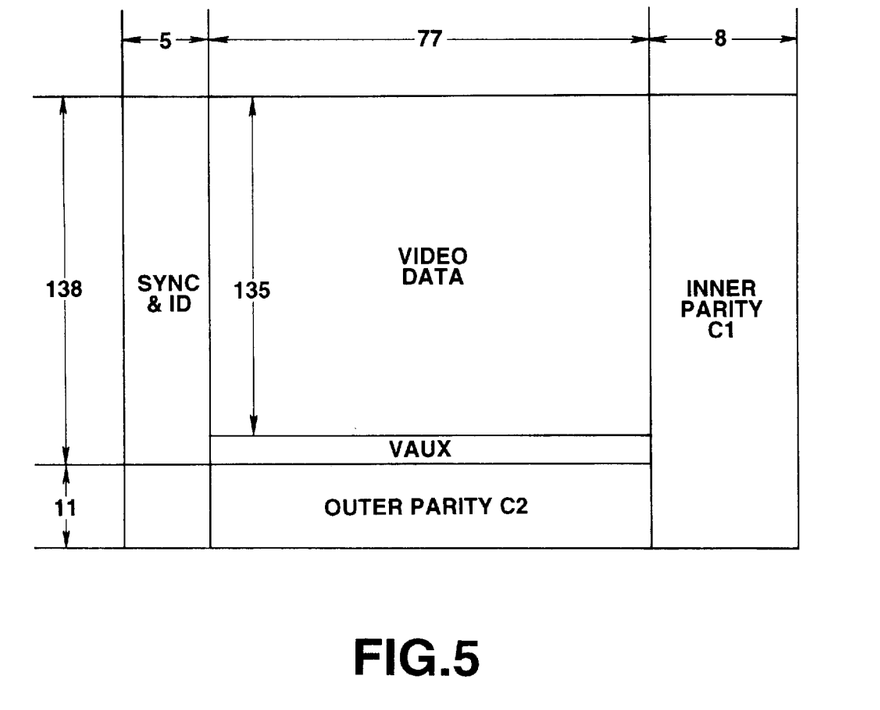
FIG. 5 illustrates a video sector.

FIG. 4 shows the configuration of one track in the present digital VTR. Each track is constituted by an audio sector SEC1, a video sector SEC2 and a subcode sector SEC3. The video sector SEC2 has a capacity corresponding to video data of 135 sync blocks, as shown in FIG. 5. A 5-byte sync and ID are appended at the leading end of each sync block. Spare data (VAUX) corresponding to 3 sync blocks are appended to these video data. Using product codes, double error correction codes (C1 and C2) are appended.

Figure 6:
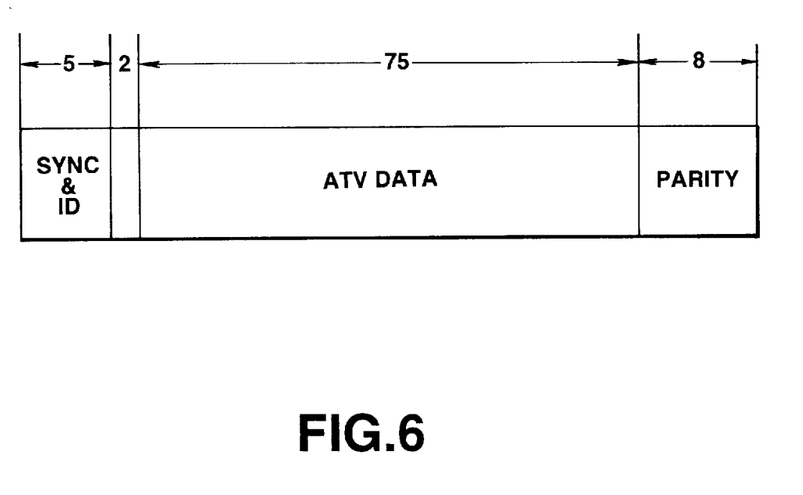
FIG. 6 illustrates a sync block.

Thus the video data corresponding to 135 sync blocks can be recorded in each track of the video sector SEC2. For the SD mode, the rpm of the rotary drum is 150 Hz. Two heads with different azimuth angles are mounted on the rotary drum so that data is azimuth-recorded on ten tracks per frame. For recording ATV system signals, that is ATV signals, the data area in each sync block (1 SB) is 77 bytes or 77×8=616 bits, as shown in FIG. 6.

Assuming that each frame of a color input picture having a 4:2:0 structure is made up of 1920×10180 pixels, the number of DCT blocks for luminance data in one frame is (1920/8)×(1080/8)=240×135 DCT blocks, while that for chrominance data is (240/2)×(135/2)=120×68 DCT blocks.

Figure 7:
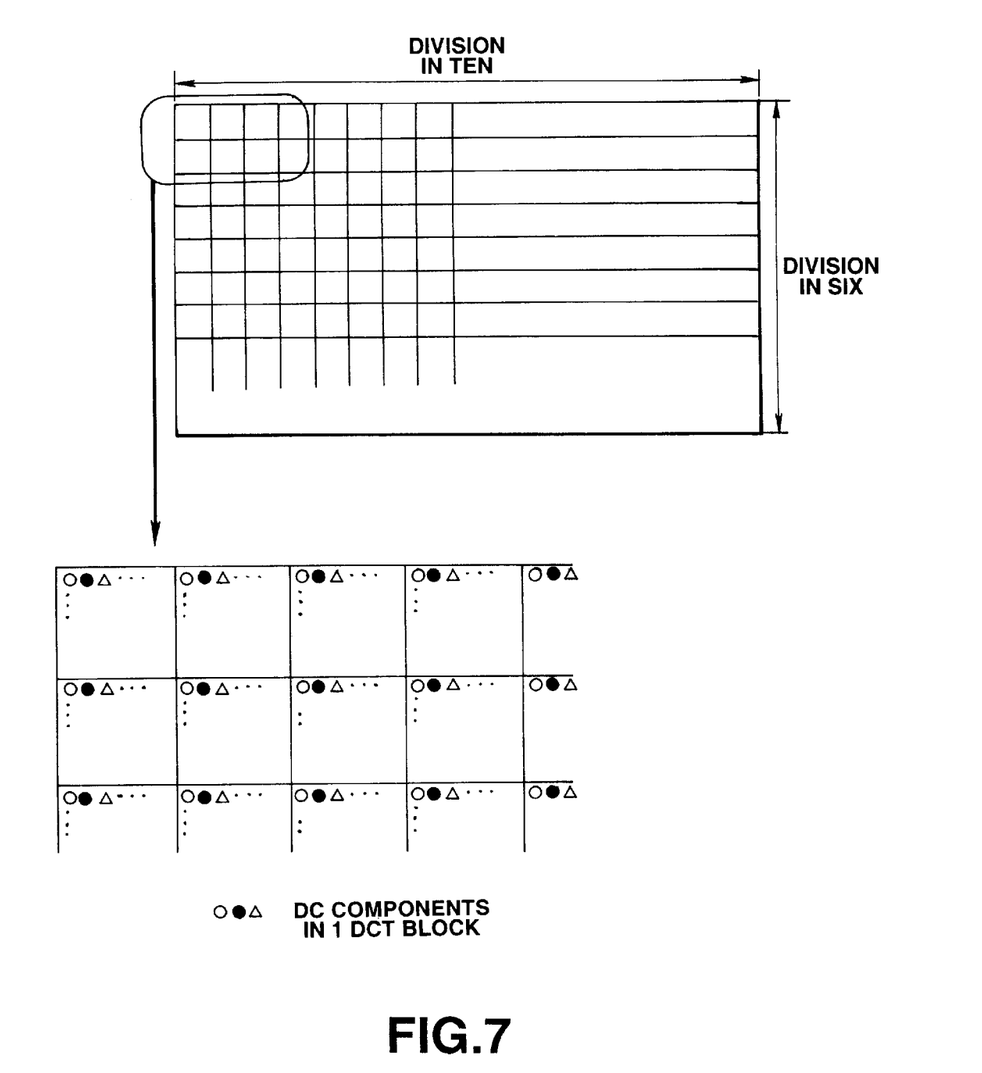
FIG. 7 illustrates a sub-sampled set of DC coefficient data recorded in a trick play area.

Then, as shown in FIG. 7, a frame is divided in ten in the horizontal direction and in six in the vertical direction. From each divided area, 1 DCT block is picked up, and 9 dummy blocks are provided. Thus, luminance data becomes (240/10)×((135+9)/6)=24×24 blocks. On the other hand, 4 dummy blocks are provided, so that each chrominance data becomes (120/10)×((68 +4)/6)=12×12 blocks. These blocks are termed sub-sampled DC coefficient sets.

Figure 8:
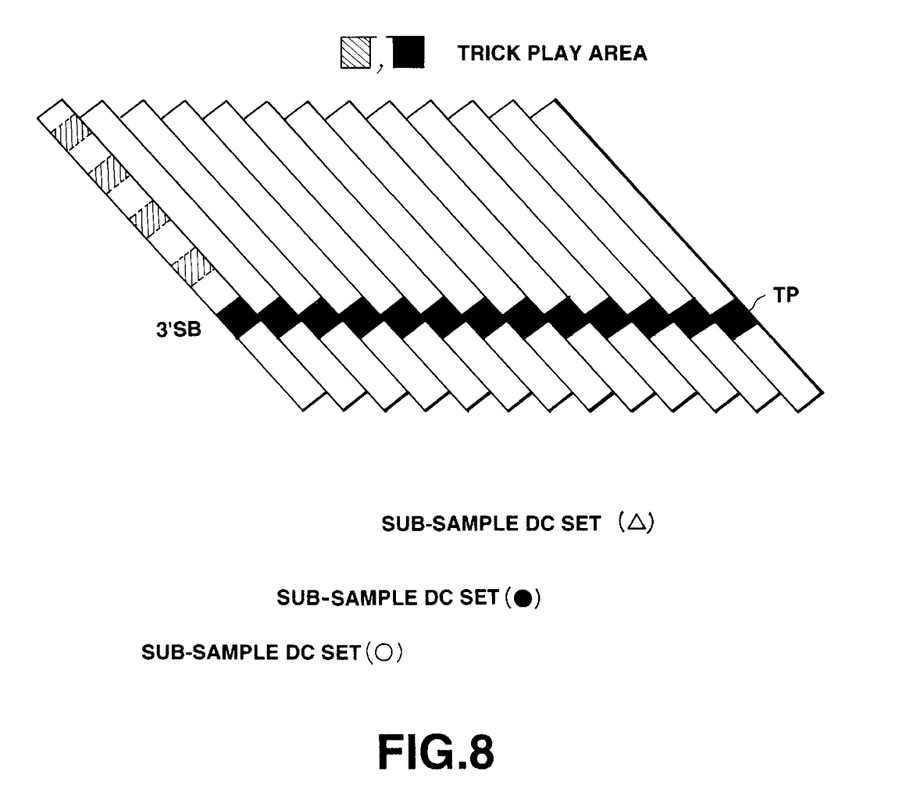
FIG. 8 shows recording contents of the trick play area.

A first set of sub-sampled DC coefficients, denoted by ○ in FIG. 7, is collected and sequentially recorded in the trick play area. Then, another set of sub-sampled DC coefficients, denoted by ● in FIG. 7, is collected and sequentially recorded in the trick play area. In this manner, all DC coefficient data in one frame are recorded in the trick play areas TP, as shown in FIG. 8.

If the DC coefficient data is 10 bits, each set of the sub-sample DC coefficients is 10×6×10=600 bits, so that it can be recorded in the above-mentioned sync bit of 616 bits.

Consequently, during reproduction, each frame can be constituted by sub-sampled DC coefficients, if 1SB can be reproduced. In effect, 3 SBs of the luminance data and chrominance data give sub-sampled DC coefficient sets capable of constituting one frame. With the 4:2:0 structure color picture data, since the number of the chrominance data is one-half that of the luminance data, the chrominance data can be recorded twice by way of duplex recording.

For variable-speed reproduction, if the reproducing speed is such that three or more SBs exist in each burst, data of the sub-sampled DC coefficient sets for one frame can be reproduced at an arbitrary speed. On the other hand, the lower the speed, the shorter is the interval between head scans, so that data of many sub-sample DC coefficient sets can be reproduced. An actual playback picture is constituted by interpolating other non-reproduced DC coefficient data with data of the sub-sampled DCT coefficient sets. Consequently, since data of many sub-sampled DC coefficient sets can be reproduced at lower speeds, the sub-sampling interval becomes shorter to enable a picture of a higher quality to be constituted.

If the trick play area for one track is 3 SBs, trick play data is recorded over 24×24=576 tracks. Thus, all I-pictures can not necessarily be recorded, resulting in the lowering of the updating ratio during playback. For example, if the trick play area for one track is of 12 SBs, it can be recorded with 576/(12/3)=144 tracks.

As shown by four shaded areas of a track in FIG. 8, plural trick play areas, inclusive of the trick play area in black, may be provided for one track. Such plural tracks may be arranged side-by-side.

Figure 9:
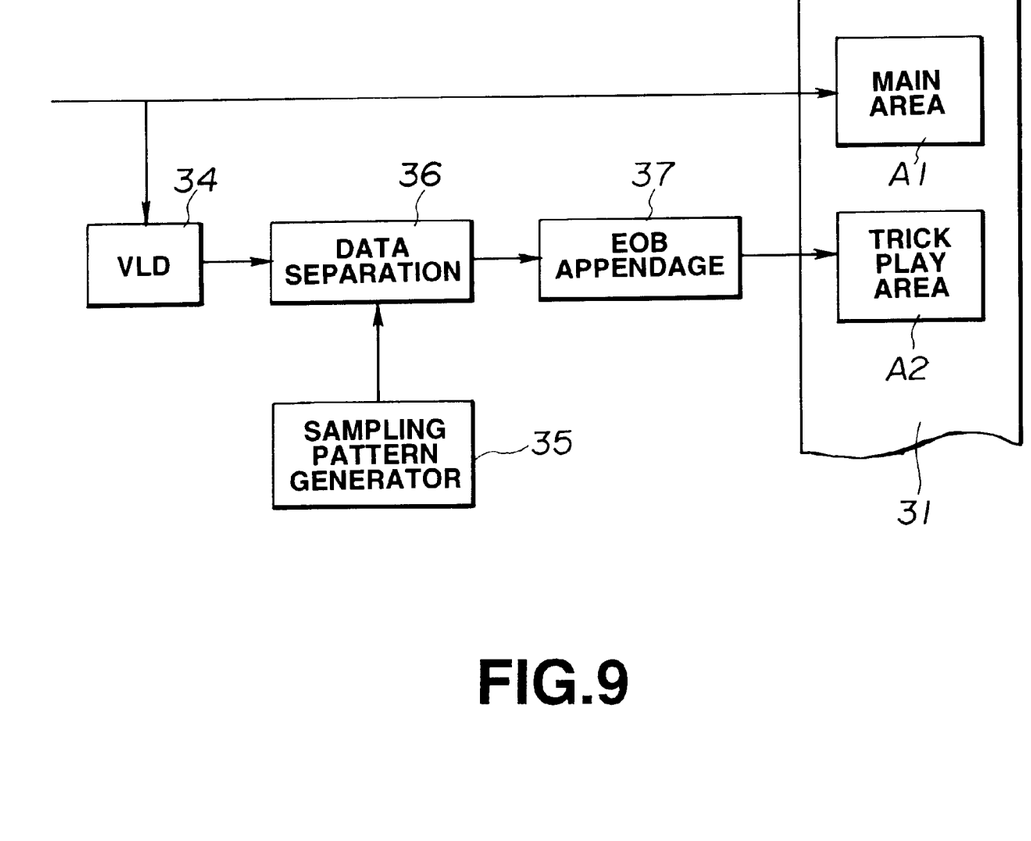
FIG. 9 is a block diagram for illustrating the principle of the recording operation in the digital VTR.

FIG. 9 schematically illustrates recording/reproduction of ATV signals. A main area Al and a trick play area A2 are provided on a video sector of a magnetic tape 31. The trick play area A2 corresponds to the above-described allowance recording area which is provided in an area reproducible during variable-speed reproduction. During recording, an input bitstream of ATV signals or a data stream is directly recorded in the main area A1, while being supplied to a VLD decoding circuit 34. The VLD decoding circuit 34 decodes the ATV signals to detect breaking points of the variable length encoded DCT coefficients in order to transmit fixed length DC coefficient data to a data separating circuit 36.

Based upon the sub-sampled pattern supplied from the sub-sampled pattern generator 35, the data separating circuit 36 extracts sub-sampled DC coefficient data, as data required for variable-length reproduction, from the bitstream of the DC coefficient data supplied form the VLD decoding circuit 34, based upon the sub-sampled pattern supplied from the sub-sampled pattern generator 35.

The data required for variable-speed reproduction are only DC coefficient data of respective blocks of the I-picture of ATV signals. The I-picture data required for this variable-speed reproduction is supplied to an EOB appending circuit 37. The EOB appending circuit 37 appends an EOB specifying an end of block. The data for the I-frame necessary for variable-speed reproduction, that is DCT coefficient data of respective blocks of the I-picture, is recorded in the trick play area A2 as sub-sampled DC coefficient set data.

During normal reproduction, playback signals from the main area A1 are decoded. During variable-speed reproduction, only the trick play area A2 is reproduced and decoded. Consequently, during variable-length reproduction, only DC coefficient data of respective blocks of the I-picture are sent to the video expansion decoder 7. In order for these data to be decoded by a usual video expansion decoder, the transmitted data construction must be the same as the construction of a usual bitstream. For this reason, the EOB data specifying end of block is appended after extraction of the dc component from the respective blocks during recording.

The illustrative construction of the interfacing and format converting section 4, framing section 25, deframing section 54 and thee packet selection circuit 59, making up the present digital VTR, is now explained. The circuits having the same functions as those of the circuits shown in FIGS. 1 to 3 and 9 are denoted by the same numerals and the corresponding explanation is omitted.

Figure 10:
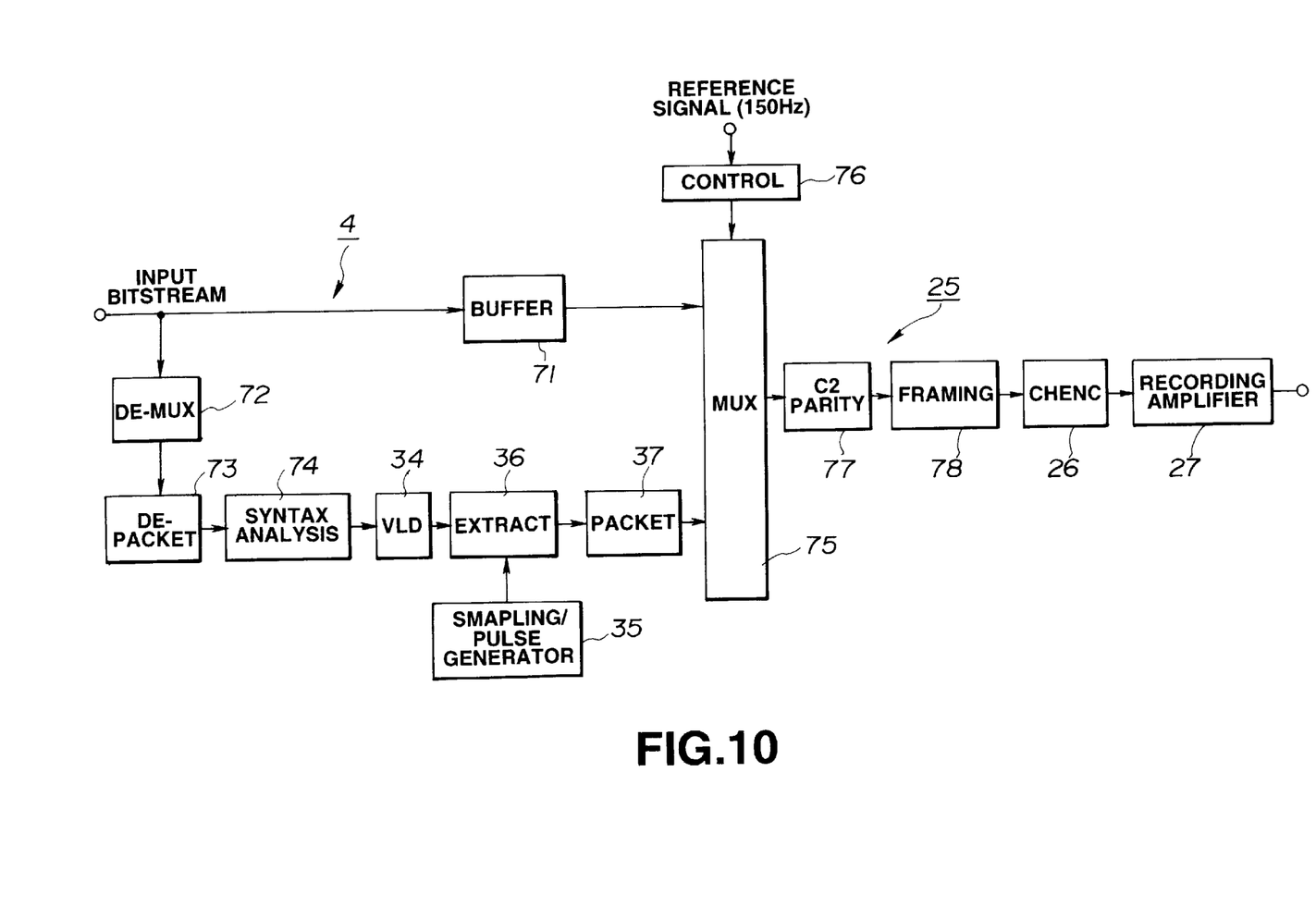
FIG. 10 is a block diagram showing an illustrative construction of a recording system of the digital VTR.

Referring to FIG. 10, the interfacing and format converting section 4 constituting the recording system of the digital VTR 3 includes a buffer memory 71 for temporarily storing ATV signals, and a demultiplexor 72 for extracting video signal packets from the ATV signals. The interfacing and format converting section 4 also includes a depacketing circuit 73 for resolving the video signal packets from the demultiplexor 72 into respective packets, and a syntax analysis circuit 74 for analyzing the header of each packet for extracting I-picture data. The interfacing and format converting section 4 also includes the above-mentioned VLD decoding circuit 34 for detecting the breaking points of the DCT coefficients and the above-mentioned data separating circuit 36 for extracting trick play data made up of sub-sampled DC coefficient sets of the DCT coefficient data of respective blocks of the I-picture based upon the sub-sampled pattern supplied from the sub-sampled pattern generator 35. The interfacing and format converting section 4 finally includes a multiplexor 75 for time-divisionally multiplexing trick play data from the data separating circuit 36 and ATV signals stored in the buffer memory 71, and a control circuit 76 for controlling the multiplexor 75.

The interfacing and format converting section 4 is so configured that, when it extracts trick play data required for variable-speed reproduction from the ATV signals and inserts the trick play data into the ATV signals for forming recording data by time-divisional multiplexing, the distance from a recording start position to the trick play area on each track differs between neighboring blocks.

That is, the buffer memory 71 temporarily stores the input ATV signals and reads out the stored ATV signals on e.g., a sync block basis in order to transmit the read-out signals to the multiplexor 75.

On the other hand, the demultiplexor 72 extracts the video signal packets from the ATV signals to supply the extracted packets to the depacketing circuit 73 which then resolves the video signal packets into respective packets.

The syntax analysis circuit 74 analyzes the headers of the respective packets resolved by the depacketing circuit 73 and extracts the packets containing the I-picture data. The extracted packets are supplied to the data separating circuit 36.

The VLD decoding circuit 34 decodes the packets supplied from the depacketing circuit 73 and detects the breaking point of the variable length encoded DCT coefficients to transmit the fixed-length DCT coefficients to the data separating circuit 36.

The data separating circuit 36 extracts, from the data of the packets supplied from the VLD decoding circuit 34, trick play data made up of sub-sampled DCT coefficient sets of the DCT coefficient data of respective blocks of the I-picture, based upon the sub-sampling pattern supplied from the sub-sampling pattern generator 35, and transmits the extracted data to the EOB appending circuit 37. The EOB appending circuit 37 appends the EOB to the low-range coefficients of the respective blocks of the I-picture and transmits the resulting data on the sync block basis to the multiplexor 75.

The multiplexor 75 time-divisionally multiplexes the ATV signals read out from the buffer memory 71 and the trick play data from the data separating circuit 36.

That is, the control circuit 76 time-divisionally multiplexes the ATV signals read out from the buffer memory 71 and the trick play data from the data separating circuit 36. The recording data thus obtained on time-divisionally multiplexing the ATV signals and the trick play data are supplied via the switching circuit 24 shown in FIG. 2 to the framing section 25.

The framing section 25 has a C2 parity circuit 77 for appending the outer parity and a framing circuit 78 for appending the inner parity, as shown in FIG. 10. The C2 parity circuit 77 appends the outer parity C2 to recording data supplied from the multiplexor 75, while the framing circuit 78 appends the inner parity C1 and the 5-byte sync and ID to the recording data and transmits the resulting data to the channel encoder 26.

Thus the sub-sampling DCT coefficient sets of the DCT coefficient data of respective blocks of the I-picture are recorded on the trick play area.

Figure 11:
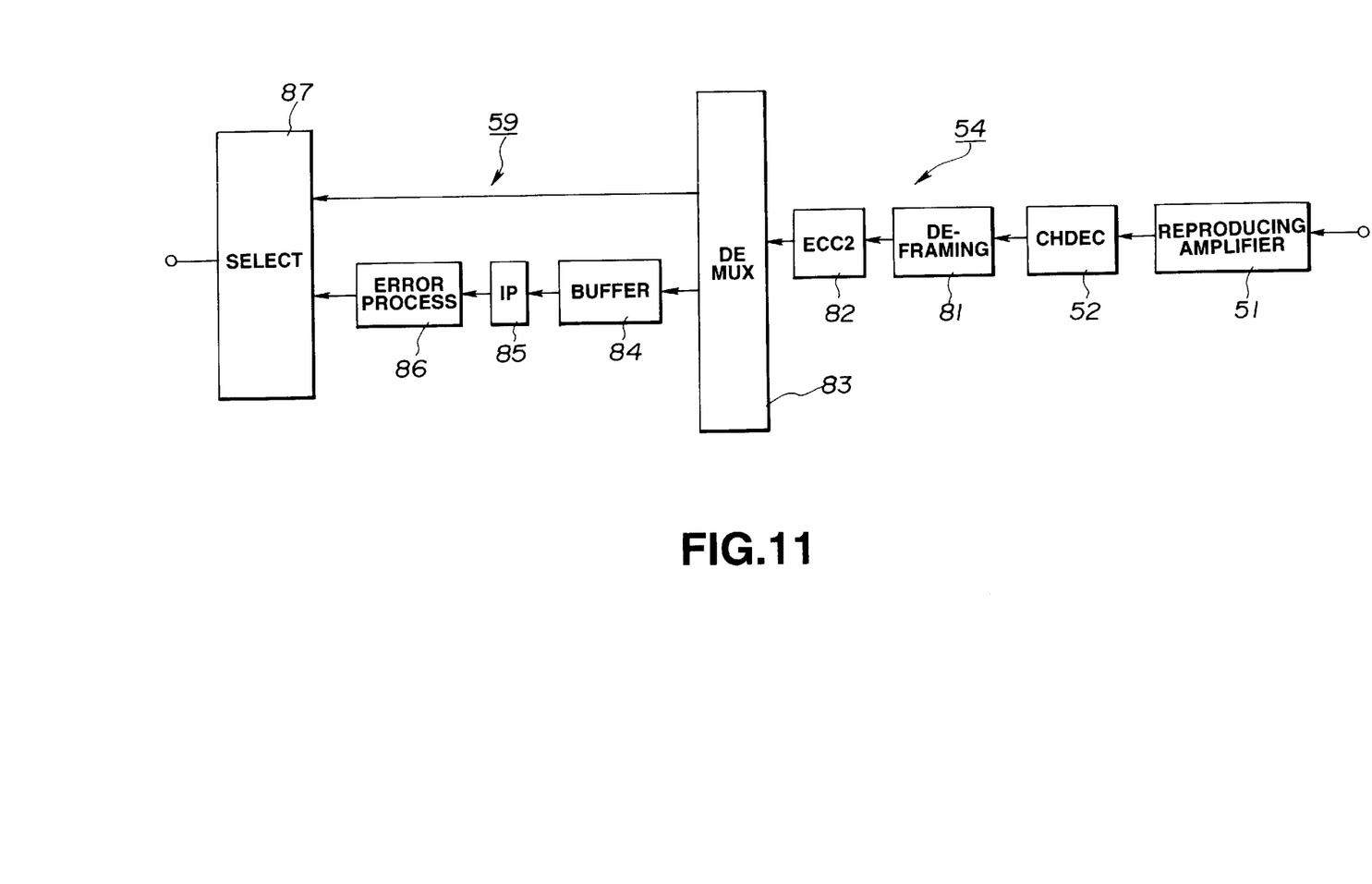
FIG. 11 is a block diagram showing an illustrative construction of a reproducing system of the digital VTR.

The deframing section 54, constituting the reproducing system of the digital VTR 3, includes a deframing circuit 81 for correcting the playback data for error by the inner parity C1 and for correcting the playback data for error by the outer parity C2, as shown in FIG. 11.

The deframing circuit 81 corrects the playback data supplied from the channel decoder 52 via the TBC 53 shown in FIG. 3 for errors by the inner parity C1 and routes the resulting data to the error correcting circuit 82.

The error correcting circuit 82 corrects the playback data supplied during normal reproduction for errors by the outer parity C2. However, the error correcting circuit 82 does not perform error correction during variable-speed reproduction of ATV signals, that is, it does not correct the playback data constituted solely by the trick play data for errors. An output of the error correction circuit 82 is supplied via the switching circuit 55 shown in FIG. 3 to the DCT expansion circuit 56 and via the switching circuit 55 to the packet selection circuit 59 during reproduction of the component video signals and during reproduction of the ATV signals, respectively.

Turning again to FIG. 11, the packet selection circuit 59 includes a demultiplexor 83 for distributing playback data between normal reproduction and variable-speed reproduction, and a buffer memory 84 for temporarily storing playback data during variable-speed reproduction. The circuit 59 also includes an interpolation circuit 85 for interpolating the playback data stored in the buffer memory 84, an error processing circuit 86 for setting data not corrected for errors by the inner parity C1 to zero, and a selector 87.

The demultiplexor 83 decodes the packets of the ATV signals and transmits all packets of the playback data supplied from the error correcting circuit 82 to the selector 87 during normal reproduction of the ATV signals while transmitting sub-sampled DCT coefficient sets of the DCT coefficient data of respective blocks of the I-picture reproduced as the trick play data required for variable-speed reproduction from the trick play area to the buffer memory 84 during variable-speed reproduction.

The buffer memory 84 temporarily stores data of the sub-sampled DCT coefficient data reproduced from the trick play area and, at a time point when data for one full frame is readied, transmits the stored DCT coefficient data via the interpolating circuit 85 to the error processing circuit 86. The interpolating circuit 85 interpolates other DCT coefficient data, which have failed to be reproduced, with data of the sub-sampled DCT coefficient sets supplied from the buffer memory 84. The error processing circuit 86 sets data, for which error correction was unable to be done in the deframing circuit 81 with the aid of the inner parity C1, to zero, and transmits data of the I-picture, made up of DCT coefficient data for one frame interpolated by the interpolating circuit 85, to the selector 87.

The selector 87 selects the playback data directly supplied from the demultiplexor 83 during normal reproduction of the ATV signals, while selecting the playback data supplied from the error processing circuit 85 during variable-speed reproduction. The selector routes the selected data to the video expansion decoder 7 shown in FIG. 1.

In the trick play area, one full frame of the I-picture, made up only of DCT coefficients, is recorded. If simply the reproduced picture is sent to the video expansion decoder 7, there is no assurance that the display timing (1/30 second) be matched to the timing of the I-picture boundary, such that the actual picture is not updated on the frame basis but only partial updating results. Thus, before sending playback data to the video expansion decoder 7, one-frame data is fully reproduced and readied and subsequently the playback data is supplied to the video expansion decoder 7. This enables an actual picture to be updated on the frame basis to permit a variable-speed reproduced picture which is easy to view. It is also possible to use a common buffer memory for the buffer memory 71 of the recording system and for the buffer memory 84 of the playback system and to switch the common buffer for recording and reproduction.

Although the foregoing description has been made of the digital VTR configured for recording ATV system signals, it is to be noted that the present invention may be applied to a VTR configured for recording input data obtained on encoding video signals adaptively switched between intra-picture encoding and inter-picture predictive encoding.

What is claimed is:

1. A method for recording digital video signals on a track of a magnetic tape using an azimuth recording system, said digital video signals including variable-speed playback data and encoded digital video signals adaptively switched between intra-picture encoding and inter-picture encoding, said method comprising the steps of:

dividing each track into an audio sector, a video sector and a subcode sector, said video sector being comprised of a first area and a second area;

receiving and recording said encoded digital video signals directly in said first area of said each track;

receiving and decoding said encoded digital video signals comprised of variable length encoded DCT coefficients that form an image defined by the digital video signals;

generating said variable-speed playback data from the decoded digital video signals by extracting fixed length DC coefficient data from said variable length decoded DCT coefficients and by arranging the extracted fixed length DC coefficient data into a plurality of blocks, said variable-speed playback data being based on said intra-picture encoding;

appending end-specifying data to the extracted fixed length DC coefficient data in each block; and recording said variable-speed playback data sequentially in said second area which is provided in multiple positions spaced apart from each other on said each track.

2. The method according to claim 1, wherein said digital video signals are formed of multiple sync blocks.

3. The method according to claim 2, wherein said second area includes said multiple sync blocks.

4. An apparatus for recording digital video signals on a track of a magnetic tape using an azimuth recording system, said digital video signals including variable-speed playback data and encoded digital video signals adaptively switched between intra-picture encoding and inter-picture encoding, said apparatus comprising:

means for dividing each track into an audio sector, a video sector and a subcode sector, said video sector being comprised of a first area and a second area;

means for receiving and recording said encoded digital video signals directly in said first area of said each track;

a decoding circuit for receiving and decoding said encoded digital video signals comprised of variable length encoded DCT coefficients that form an image defined by the digital video signals;

a data separating circuit for generating said variable-speed playback data from the decoded digital video signals received from said decoding circuit by extracting fixed length DC coefficient data from said variable length decoded DCT coefficients and by arranging the extracted fixed length DC coefficient data into a plurality of blocks, said variable-speed playback data being based on said intra-picture encoding;

means for appending end-specifying data to the extracted fixed length DC coefficient data in each block; and means for recording said variable-speed playback data sequentially in said second area which is provided in multiple positions spaced apart from each other on said each track.

5. The apparatus according to claim 4, further comprising means for multiplexing said variable-speed playback data and said encoded digital video signals for recording on said each track.

6. The apparatus according to claim 4, wherein said digital video signals are formed of multiple sync blocks.

7. The apparatus according to claim 6, wherein said second area includes said multiple sync blocks.

8. An apparatus for reproducing digital video signals from a track on a magnetic tape being divided into an audio sector, a video sector and a subcode sector and having recorded thereon by an azimuth recording system encoded digital video signals obtained by adaptively switching between intra-picture encoding and inter-picture encoding, said track having said video sector comprised of a first area in which said encoded digital video signals have been directly recorded and a second area in which variable-speed playback data comprised of variable length encoded DCT coefficients that form an image defined by the digital video signals has been sequentially recorded, said variable-speed playback data having been generated by extracting fixed length DC coefficient data from variable length decoded DCT coefficients, by arranging the extracted fixed length DC coefficient data into a plurality of blocks and by appending end-specifying data to the extracted fixed length DC coefficient data in each block, said variable-speed playback data being based on said intra-picture encoding, said apparatus comprising:

data separating means for separating data reproduced from said first area and data reproduced from said second area;

memory means with a one frame storage capacity for receiving said data reproduced from said second area;

interpolating means for interpolating missing portions of said data stored in said memory means during a variable-speed reproduction;

data switching means for selecting between said data reproduced from said first area during a normal reproduction and said interpolated data during said variable-speed reproduction; and means for outputting said interpolated data as said variable-speed playback data for one frame, wherein said second area is provided on each track in multiple positions spaced apart from each other.

9. The apparatus according to claim 8, wherein said digital video signals are formed of multiple sync blocks.

10. The apparatus according to claim 9, wherein said second area includes said multiple sync blocks.

* * * * *